United States Patent
Zhang et al.

(10) Patent No.: US 11,520,036 B2
(45) Date of Patent: Dec. 6, 2022

(54) METHOD AND APPARATUS FOR SPACE-VARIANCE CORRECTION IMAGING OF BISTATIC SAR, DEVICE AND STORAGE MEDIUM

(71) Applicant: Institute of Electronics, Chinese Academy of Sciences, Beijing (CN)

(72) Inventors: Heng Zhang, Beijing (CN); Yu Wang, Beijing (CN); Tingzhu Fang, Beijing (CN); Da Liang, Beijing (CN); Haoyu Lin, Beijing (CN); Yunkai Deng, Beijing (CN)

(73) Assignee: Institute of Electronics, Chinese Academy of Sciences, Beijing (CN)

( * ) Notice: Subject to any disclaimer, the term of this patent is extended or adjusted under 35 U.S.C. 154(b) by 79 days.

(21) Appl. No.: 17/316,748

(22) Filed: May 11, 2021

(65) Prior Publication Data
US 2021/0349205 A1 Nov. 11, 2021

(30) Foreign Application Priority Data
May 11, 2020 (CN) .......................... 202010395365.4

(51) Int. Cl.
*G01S 13/90* (2006.01)
(52) U.S. Cl.
CPC ....... *G01S 13/9058* (2019.05); *G01S 13/9011* (2013.01); *G01S 13/9029* (2013.01)
(58) Field of Classification Search
CPC ............. G01S 13/9058; G01S 13/9011; G01S 13/9029
See application file for complete search history.

(56) References Cited

U.S. PATENT DOCUMENTS

| 5,113,193 A | 5/1992 | Powell |
| 7,391,357 B1 * | 6/2008 | Doerry .................. G01S 13/904 |
| | | 342/25 R |

FOREIGN PATENT DOCUMENTS

| CN | 102147469 A | 8/2011 |
| CN | 102778681 A | 11/2012 |

(Continued)

OTHER PUBLICATIONS

Meng Ziqiang, Li Yachao, Xing Mengdao, Bao Zheng. Phase Space-variance Correction Method for Missile-borne Bistatic Forward-looking SAR Based on Equivalent Range Equation[J]. Journal of Electronics & Information Technology, 2016, 38(3): 613-621. doi: 10.11999/JEIT150782 (Year: 2016).*

(Continued)

*Primary Examiner* — Peter M Bythrow
*Assistant Examiner* — Nazra Nur Waheed
(74) *Attorney, Agent, or Firm* — Syncoda LLC; Feng Ma

(57) ABSTRACT

A method for space-variance correction imaging of BiSAR includes: motion parameters corresponding to a target point in an equivalent monostatic mode are calculated using a first motion trajectory, a second motion trajectory and an imaging parameter for focusing a radar echo signal, the target point at least including a center point of an imaging scene; azimuth Doppler center bias correction is performed on the radar echo signal by using the motion parameters corresponding to the center point; uniform and residual range cell migration correction is performed on a corrected signal, range blocking is performed, and range space-variance phase errors are corrected block by block; azimuth blocking is performed, and a corresponding number of filters are constructed for filtering processing; and inverse Doppler center bias correction is further performed to obtain a final imaging result graph.

14 Claims, 13 Drawing Sheets

(56) References Cited

FOREIGN PATENT DOCUMENTS

| CN | 103323828 | A | 9/2013 |
|---|---|---|---|
| CN | 104898120 | A | 9/2015 |
| CN | 108490439 | A | 9/2018 |
| CN | 108710111 | A | 10/2018 |
| CN | 109143238 | A | 1/2019 |
| CN | 109597072 | A | 4/2019 |
| EP | 2660623 | A2 | 11/2013 |

OTHER PUBLICATIONS

M. Rodriguez-Cassola, P. Prats-Iraola, G. Krieger and A. Moreira, "On the use of Time-Domain SAR Focusing in Spaceborne SAR Missions," IGARSS 2019-2019 IEEE International Geoscience and Remote Sensing Symposium, 2019, pp. 755-758, doi: 10.1109/IGARSS.2019.8900230. (Year: 2019).*

Meng Ziqiang Al., "Phase Space-variance Correction Method for Missile-borne Bistatic Forward-looking SAR Based on Equivalent Range Equation", Journal of Electronics and Information technology>, issued on Mar. 31, 2016.

Marc Rodriguez-Cassol Al.,"On the use of Time-Domain SAR Focusing in Spaceborne SAR Missions",<IGARSS 2019-2019 IEEE International Geoscience and Remote Sensing Symposium>, issued on Nov. 14, 2019.

* cited by examiner

METHOD AND APPARATUS FOR
SPACE-VARIANCE CORRECTION IMAGING
OF BISTATIC SAR, DEVICE AND STORAGE
MEDIUM

CROSS-REFERENCE TO RELATED APPLICATION

This application claims priority to Chinese patent application no. CN 202010395365.4 filed on May 11, 2020, the disclosure of which is hereby incorporated by reference in its entirety.

TECHNICAL FIELD

The disclosure relates to a Bistatic Synthetic Aperture Radar (BiSAR) technology, and particularly to a method and apparatus for space-variance correction imaging of BiSAR, a device and a storage medium.

BACKGROUND

A BiSAR is a SAR imaging mechanism of which a receiver and a transmitter are in different working platforms spaced by a certain distance in the space. Due to separate arrangement of transmission and receiving platforms, a BiSAR system has many advantages that a conventional SAR does not have. First, transmission and receiving systems are separated, so that a configuration of "one transmitter and multiple receivers" may be implemented with relatively low hardware cost. Second, a transmitter and a receiver are arranged in various platforms to form different bistatic imaging system, for example, a spaceborne-airborne BiSAR system is formed by an in-orbit spaceborne SAR serving as a transmission source and a receiving system formed by an airborne platform, or the receiver is arranged at a fixed position to form a satellite-ground one-station fixed BiSAR system. In addition, a BiSAR system may also be formed by double-satellite formation, for example, a present in-orbit German TanDEM-X system acquires global high-accuracy digital elevation information by double-satellite formation. A BiSAR system is flexible in baseline configuration, so that the problems of temporal decoherence and atmospheric effect of a monostatic SAR system during interference processing are avoided, and a terrain elevation measurement result better than that of the monostatic SAR system may be obtained. However, during implementation of high-accuracy imaging and interference application of a spaceborne BiSAR, a phase error caused by imaging processing is likely to be increased because an imaging algorithm does not have a high phase preserving capability.

SUMMARY

For solving the technical problem, embodiments of the disclosure provide a method and apparatus for space-variance correction imaging of BiSAR, a device and a storage medium, so as to improve a phase preserving capability of an imaging algorithm, thereby reducing a phase error caused by imaging processing and implement high-accuracy imaging.

To this end, the technical solutions of the embodiments of the disclosure are implemented as follows:

A first aspect of the embodiments of the disclosure provides a method for space-variance correction imaging of BiSAR, which includes the following operations.

A first motion trajectory of a first satellite, a second motion trajectory of a second satellite and a radar echo signal that is received by the second satellite are acquired.

Motion parameters corresponding to a target point in an equivalent monostatic mode are calculated based on the first motion trajectory, the second motion trajectory and imaging parameters for focusing the radar echo signal, the target point at least including a center point of an imaging scene.

Azimuth Doppler center bias correction is performed on the radar echo signal based on motion parameters corresponding to the center point of the imaging scene to obtain a Doppler center bias corrected signal.

Uniform range cell migration correction and residual range cell migration correction are performed on the Doppler center bias corrected signal to obtain a first corrected signal.

Range blocking is performed on the first corrected signal according to a range blocking strategy, and range space-variance phase errors are corrected block by block to obtain a second corrected signal.

Azimuth blocking is performed on the second corrected signal according to an azimuth blocking strategy, and a corresponding number of azimuth matched filters are constructed to perform filtering processing to obtain an intermediate azimuth imaging result.

Inverse Doppler center bias correction is performed on the intermediate imaging result by use of an inverse Doppler center phase correction function constructed based on the motion parameter corresponding to the center point of the imaging scene to obtain an azimuth final imaging result graph.

A second aspect of the embodiments of the disclosure provides an apparatus for space-variance correction imaging of BiSAR, which includes an acquisition unit, a calculation unit, a correction unit and an imaging unit.

The acquisition unit is configured to acquire a first motion trajectory of a first satellite, a second motion trajectory of a second satellite and a radar echo signal that is received by the second satellite.

The calculation unit is configured to calculate motion parameters corresponding to a target point in an equivalent monostatic mode based on the first motion trajectory, the second motion trajectory and imaging parameters for focusing the radar echo signal, the target point at least including a center point of an imaging scene.

The correction unit is configured to perform azimuth Doppler center bias correction on the radar echo signal based on the motion parameter corresponding to the center point of the imaging scene to obtain a Doppler center bias corrected signal.

The correction unit is configured to perform uniform range cell migration correction and residual range cell migration correction on the Doppler center bias corrected signal to obtain a first corrected signal.

The correction unit is configured to perform range blocking on the first corrected signal according to a range blocking strategy and correct range space-variance phase errors block by block to obtain a second corrected signal.

The correction unit is further configured to perform azimuth blocking on the second corrected signal according to an azimuth blocking strategy and construct a corresponding number of azimuth matched filters to perform filtering processing to obtain an intermediate azimuth imaging result.

The imaging unit is configured to perform inverse Doppler center bias correction on the intermediate imaging result by use of an inverse Doppler center phase correction function constructed based on the motion parameters corresponding to the center point of the imaging scene to obtain a final azimuth imaging result.

A third aspect of the embodiments of the disclosure provides a device for space-variance correction imaging of BiSAR, which includes a processor and a memory configured to store computer programs capable of running in the processor, where the processor is configured to run the computer programs to execute the steps of the method as described above.

A fourth aspect of the embodiments of the disclosure provides a computer-readable storage medium, in which computer program are stored, where the computer programs, when being executed by a processor, cause the processor to implement the steps of the method as described above.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

It is to be noted that a BiSAR system is flexible in baseline configuration, so that the problems of temporal decoherence and atmospheric effect of a monostatic SAR system during interference processing are solved, and thus a terrain elevation measurement result better than that of the monostatic SAR system may be obtained. However, during implementation of high-accuracy imaging and interference application of a BiSAR system, an imaging algorithm is required to have a high phase preserving capability, and the premise of the high phase preserving capability is to implement space-variance characteristic correction at each scattering point in an imaging scene.

In a BiSAR system, a transmitter and a receiver are separately arranged in the space and have different motion vectors, resulting in different minimum ranges and Doppler characteristics of point targets in the same range bin. Therefore, the Doppler parameters varying with the range bins are considered for range compression, and compression filter mismatching caused by variation of a velocity parameter in the same range bin is considered for azimuth compression. That is, space-variance characteristic correction is implemented through range space-variance error correction and azimuth multi-matched-filter processing, which reduces the phase error caused by imaging processing.

For solving the problem, the embodiments of the disclosure provide a method for space-variance correction imaging of BiSAR.

Figure 1:
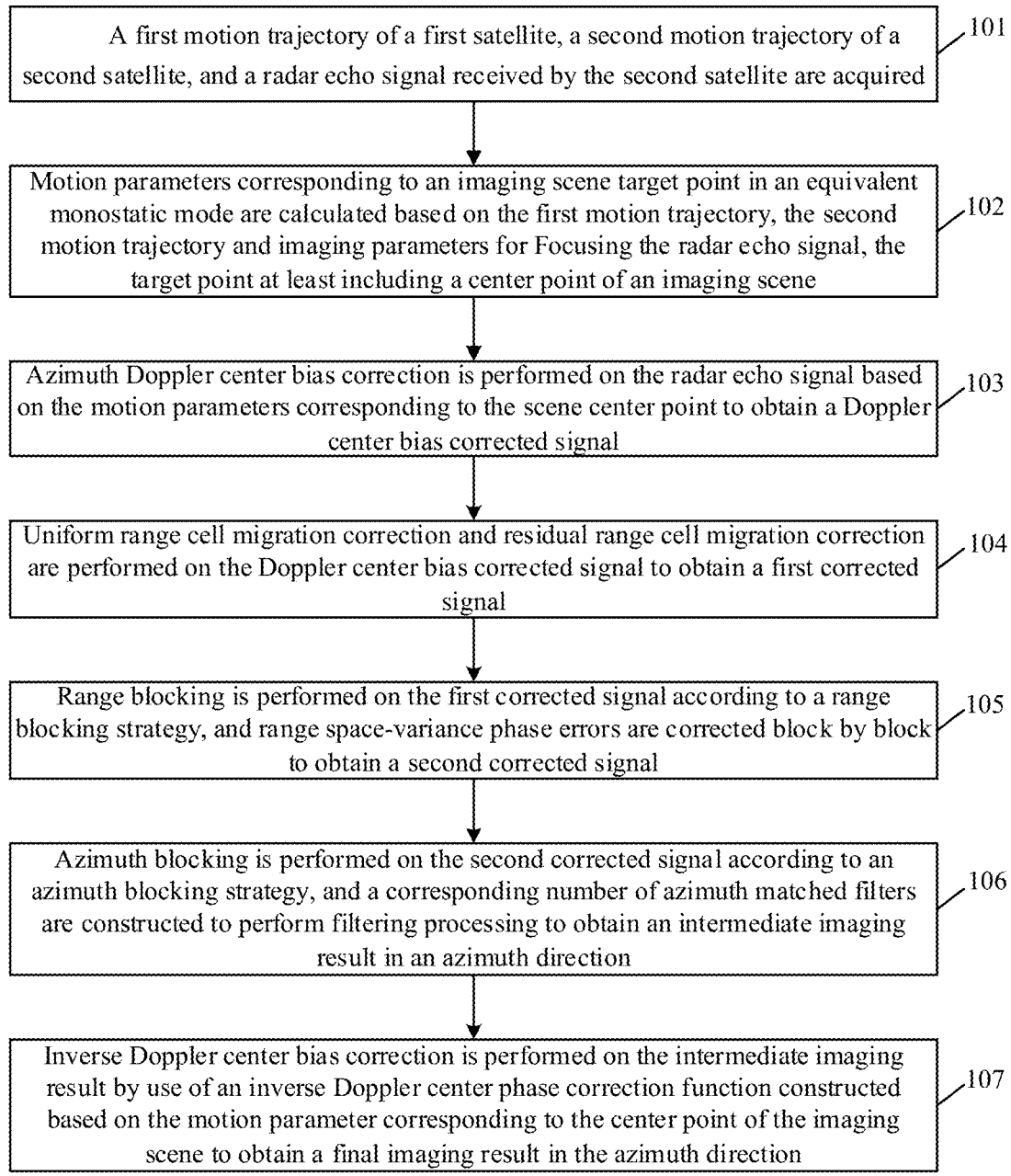
FIG. 1 is a flowchart of a method for space-variance correction imaging of BiSAR according to some embodiments of the disclosure.

FIG. 1 is a flowchart of a method for space-variance correction imaging of BiSAR according to some embodiments of the disclosure. As shown in FIG. 1, steps 101 to 104 may be executed by a processor of an apparatus for space-variance correction imaging apparatus of BiSAR. The method for space-variance correction imaging of BiSAR may specifically include the following steps.

In 101, a first motion trajectory of a first satellite, a second motion trajectory of a second satellite and a radar echo signal that is received by the second satellite are acquired.

It is to be noted that the first satellite transmits a radar signal to an illuminated scene on the ground, and the illuminated scene reflects a radar echo signal back to the first satellite and the second satellite. Herein, the first satellite may be a primary satellite, and the second satellite may be a secondary satellite. A ground monitoring device is configured to receive the radar echo signal acquired by the second satellite and perform space-variance correction imaging on the radar echo signal.

In the disclosure, correction processing is mainly performed on the radar echo signal received by the second satellite.

Herein, the ground monitoring device receives and parses a data packet transmitted by the second satellite, the data packet including a first motion trajectory $\vec{s}_1(\eta_n)$ of the first satellite, a second motion trajectory $\vec{s}_2(\eta_n)$ of the second satellite and a radar echo signal $s(t,\eta_n)$ received by the second satellite.

In 102, motion parameters of a target point in an equivalent monostatic mode is calculated based on the first motion trajectory, the second motion trajectory and imaging parameters for focusing the radar echo signal, where the target point at least includes a center point of an imaging scene.

It is to be noted that, before focusing the radar echo signal by using an imaging algorithm, it is necessary to design the specific imaging parameters used during imaging and calculate the motion parameters corresponding to the imaging scene in the equivalent monostatic mode by use of the first motion trajectory, the second motion trajectory and the imaging parameter.

The abovementioned imaging parameters includes latitude and longitude information of various target points in the imaging scene. It is necessary to search for corresponding height information from a DEM database according to the latitude and longitude information of each target point, so as to obtain a position coordinate of the target point in the imaging scene, the position coordinate of the target point in the imaging scene at least including a position coordinate of the center point of the imaging scene.

A bistatic range history of the target point at each pulse transmission moment is calculated by use of the first motion trajectory, the second motion trajectory and the position coordinate of the imaging target point. Furthermore, a hyperbolic range model in a monostatic SAR mode is adopted to obtain another expression of the bistatic range history, and then least variance fitting calculation is performed on the bistatic range history to obtain three motion parameters of the target point in the equivalent monostatic mode.

Exemplarily, such a hypothesis can be made that the motion trajectories of the first satellite and second satellite on a spaceborne BiSAR platform are $\vec{s}_1(\eta_n)$ and $\vec{s}_2(\eta_n)$ respectively during acquisition of an echo signal, where $\eta_n$ represents an n-th signal receiving moment, and there are the number of $N_a$ signal receiving moments, namely each satellite records the number of $N_a$ pieces of data. Moreover, at the signal receiving moment, the trajectory of the first satellite is $[\vec{s}_1(\eta_1), \vec{s}_1(\eta_2), \ldots, \vec{s}_1(\eta_{N_a})]$, and the trajectory of the second satellite is $[\vec{s}_2(\eta_1), \vec{s}_2(\eta_2), \ldots, \vec{s}_2(\eta_{N_a})]$. If the coordinate of the center point of the imaging scene is $\vec{p}_0$, the bistatic range history of the signal at each moment may be calculated for the center point of the imaging scene at each signal receiving moment, i.e., a total distance that a distance of the signal from the first satellite to a target illuminated scene on the ground plus a distance of the signal from the target illuminated scene to the second satellite. In such case, the bistatic range history corresponding to the center point of the imaging scene is expressed as:

$$R_{bi}(\eta_n) = |\vec{s}_1(\eta_n) - \vec{p}_0| + |\vec{s}_2(\eta_n) - \vec{p}_0|, n = 1, 2, 3, \ldots, N_a \quad (1)$$

Herein, in formula (1), a three-dimensional coordinate of $\vec{s}_1(\eta_n)$ of $|\vec{s}_1(\eta_n) - \vec{p}_0|$ is denoted as $\vec{s}_1(\eta_n) = [x_1(\eta_n), y_1(\eta_n), z_1(\eta_n)]$, a three-dimensional coordinate of the center point of the imaging scene is denoted as $\vec{p}_0 = [x_0, y_0, z_0]$, and $|\vec{s}_1(\eta_n) - \vec{p}_0| = \sqrt{(x_1(\eta_n) - x_0)^2 + (y_1(\eta_n) - y_0)^2 + (z_1(\eta_n) - z_0)^2}$.

During practical application, for a BiSAR system, a radar signal is transmitted to an illuminated scene on the ground by a satellite and then a radar echo signal is reflected back to the satellite, which forms a self-transmitting and self-receiving mode. In such case, a range from the satellite to the target illuminated scene may be represented as $R(\eta) = \sqrt{R_0^2 + V_0^2(t - t_0)^2}$, where $R_0$ is a minimum range of the bistatic range history, $V_0$ is an equivalent velocity, and $t_0$ is a time duration corresponding to the minimum range from the illuminated scene to the satellite. Based on the idea of range history calculation for a monostatic SAR system, equivalent monostatic approximation may be adopted during calculation of the bistatic range history. Then, the bistatic range history shown in formula (1) is represented as:

$$R_{mono}(\eta_n) = \frac{R_{bi}(\eta_n)}{2} \cong \sqrt{R_0^2 + v_0^2(\eta_n - \eta_0)^2}, n = 1, 2, 3, \ldots, N_a \quad (2)$$

Furthermore, $$\left(\frac{R_{bi}(\eta_n)}{2}\right)^2$$

is fitted by using a least variance method to calculate the three motion parameters of the center point of the imaging scene, including: a minimum range $R_0$ of the bistatic SAR range history, an equivalent velocity $v_0$ obtained after fitting, and a time duration $\eta_0$ corresponding to the minimum range.

In 103, azimuth Doppler center bias correction is performed on the radar echo signal based on the motion parameter corresponding to the center point of the imaging scene to obtain a Doppler center bias corrected signal.

It is to be noted that a Doppler center frequency corresponding to the center point of the imaging scene is generated based on the three motion parameters of the center point of the imaging scene. The Doppler center frequency may be equal to 0 or not equal to 0. When the Doppler center frequency is equal to 0, the Doppler center frequency is considered the center of the spectrum, which is bilaterally symmetrical and the imaging quality of the radar echo signal may not be influenced. However, when the Doppler center frequency is not equal to zero, an observation angle of the second satellite is inclined, the spectrum is asymmetric, and thus spectrum shifting is required to ensure that the spectrum is centered at the Doppler center frequency and is bilaterally symmetric for convenient subsequent processing.

Specifically, the Doppler center frequency corresponding to the center point of the imaging scene is obtained based on the minimum range, equivalent velocity and a time duration corresponding to the bistatic range history for the center point of the imaging scene, then an azimuth Doppler center frequency correction function is constructed by use of the Doppler center frequency corresponding to the center point of the imaging scene, and the azimuth Doppler center frequency correction function is multiplied by the radar echo signal so as to implement azimuth Doppler center bias correction of the radar echo signal.

Exemplarily, the three motion parameters of the center point of the imaging scene are: the minimum range $R_0$ of the bistatic SAR range history, the equivalent velocity $v_0$ obtained after fitting, and the time duration $\eta_0$ corresponding to the minimum range of the bistatic SAR range history. The Doppler center frequency corresponding to the center point of the imaging scene is calculated by use of the three motion parameters of the center point of the imaging scene:

$$f_{dc} = \frac{2v_0}{\lambda} \sin\left(a\tan\left(\frac{v_0 \eta_0}{R_0}\right)\right) \quad (3)$$

where $\lambda$ represents a wavelength of a carrier frequency at which the radar transmits a microwave signal.

The azimuth Doppler center frequency correction function is constructed in an azimuth time domain based on the Doppler center frequency $f_{dc}$ and the receiving moment $\eta_n$ of the n-th signal, namely:

$$H_a(\eta_n; f_{dc}) = \exp(-j2\pi f_{dc} \eta_n) \quad (4)$$

The azimuth Doppler center frequency correction function $H_a(\eta_n; f_{dc})$ is multiplied by the radar echo signal $s(t, \eta_n)$ received by the second satellite to implement azimuth Doppler center bias correction of the radar echo signal. In such case, an azimuth spectrum of the radar echo signal extends centered on the Doppler center frequency $f_{dc}$ denoted as $$\left[f_{dc} - \frac{B_a}{2}, f_{dc} + \frac{B_a}{2}\right],$$

where $B_a$ is an azimuth spectrum bandwidth.

In 104, uniform range cell migration correction and residual range cell migration correction are performed on the Doppler center bias corrected signal to obtain a first corrected signal.

It is to be noted that range space-variance correction of the Doppler center bias corrected signal is implemented in the step 104. The step is implemented by two substeps of rough processing and precise processing. During rough processing, i.e., uniform range cell migration correction, a uniform range processing function is constructed based on the motion parameters corresponding to the center point of the imaging scene, the whole imaging scene is corrected by using a unified parameter at first. In such manner, uniform range cell migration is corrected, a high-order phase of the center point of the imaging scene is simultaneously removed, and a high-order phase of another point in the imaging scene is weakened, and range cell migration of the other points in the imaging scene is also decreased. Afterwards, the precise processing is performed, i.e., range cell migration correction of each point in the whole imaging scene is completed through residual range cell migration correction. The uniform range cell migration correction is performed in a two-dimensional frequency domain, and the residual range cell migration correction is performed in a range-Doppler domain.

Specifically, when uniform range cell migration correction is performed, the Doppler center bias corrected signal in two-dimensional time-domain is transformed to that in two-dimensional frequency domain by using range Fourier transform and azimuth Fourier transform to obtain a two-dimensional frequency-domain signal. A uniform range correction function constructed based on the motion parameter corresponding to the center point of the imaging scene is multiplied by the two-dimensional frequency-domain signal to obtain a uniform range corrected signal. Range compression and uniform range cell migration correction are implemented by use of the uniform range correction function.

When the residual range cell migration correction is performed, the uniform range corrected signal is transformed from the two-dimensional frequency domain to the range-Doppler domain to obtain a range-Doppler domain signal at first. Equivalent velocities for N range points in a range axis direction of the range-Doppler domain are determined according to minimum ranges and equivalent velocities for M target points in the imaging scene, where the M target points including the center point of the imaging scene and at least one reference point of the imaging scene on a preset trajectory, and N is a positive integer. Residual range cell migration correction is obtained according to the minimum range and equivalent velocity for the center point of the imaging scene and the equivalent velocities for the N range points. The first corrected signal is obtained based on the residual range cell migration correction and the range-Doppler domain signal.

Exemplarily, the range cell migration correction includes uniform range cell migration correction and residual range cell migration correction. The uniform range cell migration correction of the radar echo signal is implemented in the two-dimensional frequency domain through the following specific steps.

In a first step, range Fourier transform and azimuth Fourier transform are performed to transform the radar echo signal $s(t, \eta_n)$ in the two-dimensional time domain to a signal in the two-dimensional frequency-domain to obtain the two-dimensional frequency-domain signal $S_{2df}(f, f_\eta)$,
which is expressed in Formula (5), where $F_r\{\cdot\}$ and $F_a[\cdot]$ represent range Fourier transform and azimuth Fourier transform respectively:

$$S_{2df}(f, f_\eta) \Leftarrow F_r\{F_a[s(t, \eta_n)]\} \quad (5)$$

In a second step, the uniform range correction function is constructed according to the motion parameters for the center point of the imaging scene. Herein, the motion parameters include the minimum range $R_0$ and equivalent velocity $v_0$ for the center point of the imaging scene. That is, an expression of the uniform range correction function is formula (6). In formula (6), f represents a range frequency, $f_0$ represents a carrier frequency for the carrier frequency for echo signal transmission of the radar, $f_\eta$ represents an azimuth frequency, and $K_r$ represents a range chirp rate:

$$H_{brcmc}(f, f_\eta; R_r, v_0) = \exp\left(-j\frac{4\pi}{\lambda}R_0 \times \left(\frac{f}{f_0} - \sqrt{\left(\frac{f_0+f}{f_0}\right)^2 - \left(\frac{\lambda f_\eta}{2v_0}\right)^2} + \sqrt{1 - \left(\frac{\lambda f_\eta}{2v_0}\right)^2}\right)\right) \times \exp\left(j\frac{\pi f^2}{K_r}\right) \quad (6)$$

In a third step, the uniform range correction function $H_{brcmc}(f, f_\eta; R_0, v_0)$ is multiplied by the two-dimensional frequency-domain signal $S_{2df}(f, f_\eta)$ to obtain the uniform range corrected signal. Range compression and uniform range cell migration correction are implemented by the uniform range correction function.

Then, residual range cell migration correction is performed on the uniform range corrected signal, and the residual range cell migration correction is implemented in the range-Doppler domain through the following specific steps.

In a first step, range inverse Fourier transform is performed on the uniform range corrected signal to obtain the range-Doppler domain signal. Herein, the range-Doppler domain signal may be represented as $S_{rd}(t, f_\eta)$.

In a second step, the equivalent velocities $v_{0m}$, m=1, 2, ..., $N_r$ for the N range points on the range direction axis for the range-Doppler domain are determined according to the minimum ranges and equivalent velocities for the M target points in the imaging scene, where the M target points including the center point of the imaging scene and at least one reference point of the imaging scene on the preset trajectory, and N is a positive integer.

Figure 2:
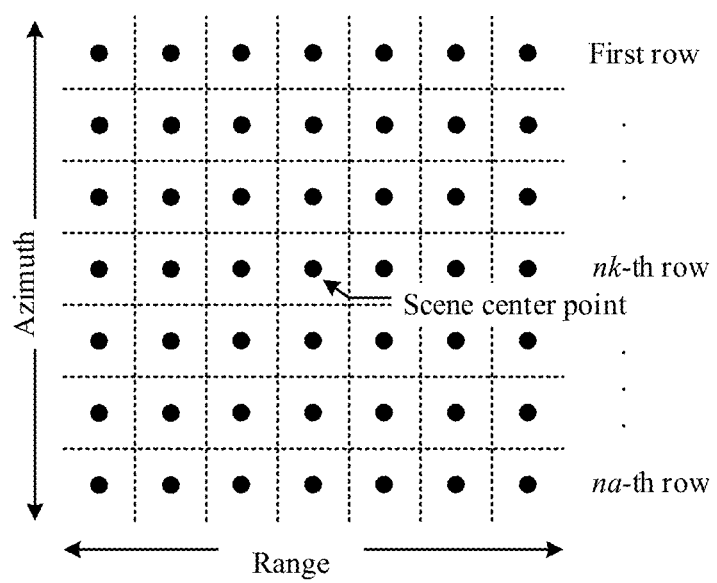
FIG. 2 is a schematic diagram of each target point in an imaging scene according to some embodiments of the disclosure.

FIG. 2 is a schematic diagram of various target points in an imaging scene according to some embodiments of the disclosure. The number of target points in the azimuth direction and range direction is $n_a \times n_r$. The M target points as mentioned above are the $n_r$ range target points in the range direction. The M target points include the center point of the imaging scene and at least one reference point of the imaging scene that are located on the preset trajectory. The preset trajectory may be an $n_k$-th row where the center point of the imaging scene is located in FIG. 2. The equivalent velocities $v_{0m}$, m=1, 2, ..., $N_r$ for the N range points on the range-direction axis of the range-Doppler domain are determined according to the minimum range and equivalent velocity for at least one target point in the $n_k$-th row.

During practical application, a range axis $[t_0, t_1, t_2, \ldots, t_{N_r}]*c/2 = [r_1, r_2, \ldots, r_{N_r}]$ may be obtained according to propagation time $[t_0, t_1, t_2, \ldots, t_{N_r}]$ of the radar echo signal, where c is the light velocity. For each target point in the $n_k$-th row in FIG. 2, a minimum range $(R_1, R_2, \ldots, R_{n_r})$ for each grid point may be calculated through an equivalent monostatic method, the number of the points corresponding to the minimum ranges is larger than the number of the points on the range axis, and there may not always be numerical values corresponding to the minimum ranges on the range axis, namely the points are not always on the raw $[r_1, r_2, \ldots, r_N]$. The equivalent velocity, i.e., $v_{0m}$, m=1, 2, ... , $N_r$, for the points on the whole range axis is obtained through a sinc interpolation function according to a corresponding relationship between the minimum range and equivalent velocity for each target point in the $n_k$-th row and the range axis. Input of the sinc interpolation function is the minimum range, i.e., the range to be interpolated, for the target point, and output of the sinc interpolation function is an equivalent velocity at the range to be interpolated.

In a third step, according to the minimum range $R_0$ and equivalent velocity $v_0$ for the center point of the imaging scene and the equivalent velocities $v_{0m}$, m=1, 2, ..., $N_r$ for the N range points, residual range cell migration is calculated as follows:

$$\delta r = \frac{R_{0m}}{D(v_{0m}, f_\eta)} - \frac{R_0}{D(v_0, f_\eta)} - (R_{0m} - R_r) \quad (7)$$

$$D(v_{0m}, f_\eta) = \sqrt{1 - \left(\frac{\lambda f_\eta}{2v_{0m}}\right)^2}, D(v_0, f_\eta) = \sqrt{1 - \left(\frac{\lambda f_\eta}{2v_0}\right)^2} \quad (8)$$

where $f_\eta$ represents the azimuth frequency, $R_{0m}$ represents a distance corresponding to the m-th point in the range direction, and the two parameters in formula (8) represent a variation factor of range cell migration along with a Doppler frequency in the range-Doppler domain.

In a fourth step, the range-Doppler domain signal is corrected by the residual range cell migration correction to obtain the first corrected signal.

In 105, range blocking is performed on the first corrected signal according to a range blocking strategy, and range space-variance phase errors are corrected block by block to obtain a second corrected signal.

It is to be noted that, since a range space-variance phase error is generated by range correction, for preventing influence on the imaging quality, blocking processing in a range direction is performed on the first corrected signal subjected to range correction, and the space-variance phase errors caused by range correction are corrected block by block to obtain a range bin signal subjected to error correction.

Specifically, range blocking is performed on the first corrected signal according to the range blocking strategy to obtain P block signals, and the obtained P block signals are transformed from the range-Doppler domain to the two-dimensional frequency domain to obtain P two-dimensional frequency-domain block signals, P being an integer greater than 1. The number of P space-variance phase error terms is calculated according to the motion parameters of the target point in the P two-dimensional frequency-domain block signals. Phase correction is performed on the P two-dimensional frequency-domain block signals by use of the P range space-variance phase error terms to obtain P phase corrected block signals. The P phase corrected block signals are transformed from the two-dimensional frequency domain to the range-Doppler domain, and transformation results are merged to obtain the second corrected signal subjected to range space-variance correction.

Figure 3:
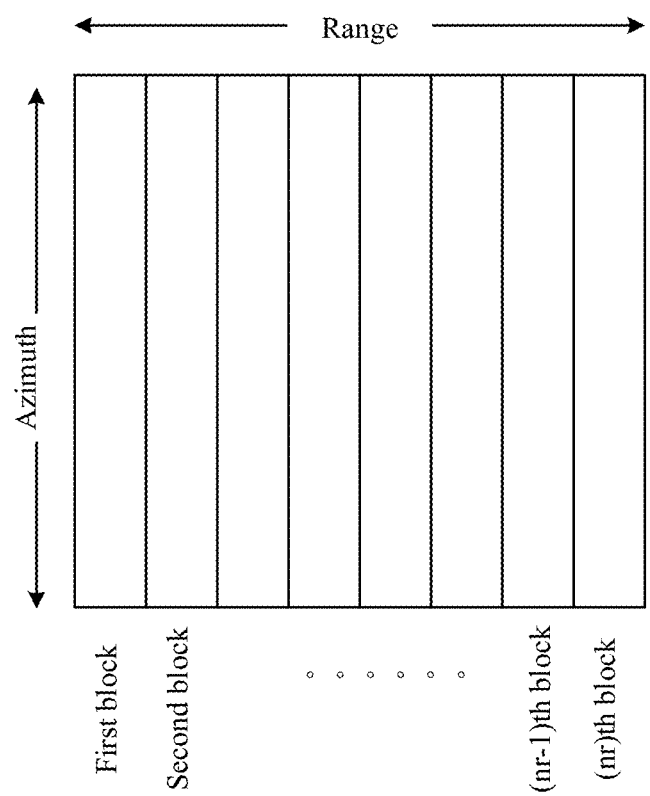
FIG. 3 is a schematic diagram of range blocking according to some embodiments of the disclosure.

Exemplarily, the range space-variance phase errors are corrected in the step 105. FIG. 3 is a schematic diagram of range blocking according to some embodiments of the disclosure. As shown in FIG. 3, range blocking is performed to obtain $n_r$ blocks, i.e., the abovementioned P blocks. The range space-variance phase errors are corrected through the following specific steps.

In a first step, range blocking is performed on the first corrected signal according to the range blocking strategy to obtain $n_r$ block signals. Herein, the block signal is denoted as $S_{rd\text{-}Blockn}$ (t, $f_\eta$)=1, 2, ..., $n_r$. Range Fourier transform is performed on the blocked signal $S_{rd\text{-}Blockn}$ (t, $f_\eta$)=1, 2, ..., $n_r$ in the range-Doppler domain to obtain a two-dimensional frequency-domain block signal $S_{2df\text{-}Blockn}$ (f, $f_\eta$), n=1, 2, ..., $n_r$.

In a second step, a corresponding space-variance phase error term $H_{var\ r}$ (f, $f_n$; $R_{0n}$, $v_{0n}$) is calculated according to the minimum range $R_{0n}$ and equivalent velocity $v_{0n}$ for the target point in each block, namely:

$$H_{varr}(f, f_\eta; R_{0n}, v_{0n}) = \exp\left(j\frac{4\pi(R_{0n} - R_0)}{c} \frac{(1 - D(v_0, f_\eta)^2)}{2f_0 D(v_0, f_\eta)^3} f^2\right), \quad (9)$$

$$n = 1, 2, \ldots, n_r$$

In a third step, the space-variance phase error term $H_{var\ r}$ (f, fη; $R_{0n}$, $v_{0n}$) is multiplied by the two-dimensional frequency-domain block signal $S_{2df\text{-}Blockn}$ (f, $f_\eta$), n=1, 2, ..., $n_r$ phase error correction is performed on each block signal, and range inverse Fourier transform is performed on the phase corrected block signal, namely the phase corrected block signal is transformed back to a signal in the range-Doppler domain, denoted as $S_{rd\text{-}Blocki}$ (t, $f_\eta$)=1, 2, ..., $n_r$. The transformed $S_{rd\text{-}Blocki}$(t, $f_\eta$)=1, 2, ..., $n_r$ is merged to obtain the second corrected signal $S_{Rd}$ (t, $f_\eta$) subjected to the range space-variance correction.

In 106, azimuth blocking is performed on the second corrected signal according to an azimuth blocking strategy, and a corresponding number of azimuth matched filters are constructed to perform filtering processing to obtain an azimuth intermediate imaging result.

It is to be noted that azimuth space-variance correction is performed in the step 106, implemented as follows. Azimuth blocking is performed on the second corrected signal, the corresponding number of azimuth matched filters is constructed for sequential filtering processing, and the azimuth intermediate imaging result is further obtained by merging processing.

Specifically, azimuth blocking is performed on the second corrected signal according to the azimuth blocking strategy to obtain Q block signals, and the corresponding azimuth matched filters are constructed, Q being an integer greater than 1. Filtering processing is performed on the obtained Q block signals by use of the Q azimuth matched filters to obtain Q matched filtering processing results respectively. The Q matched filtering processing results are transformed from the range-Doppler domain to the two-dimensional time domain, and transformation results are merged to obtain the intermediate imaging result.

Figure 4:
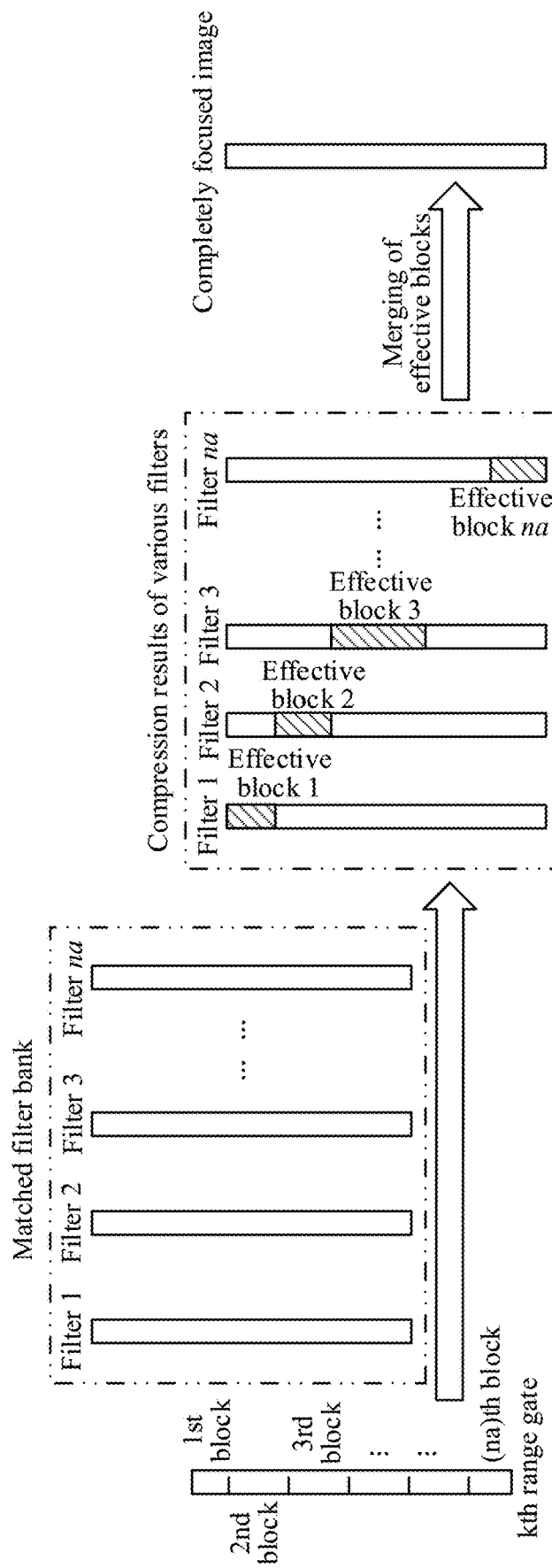
FIG. 4 is a schematic diagram of azimuth matched filtering according to some embodiments of the disclosure.

Exemplarily, FIG. 4 is a schematic diagram of azimuth matched filtering according to some embodiments of the disclosure. Azimuth space-variance correction is implemented through the following specific steps.

The second corrected signal is divided into $n_a$ blocks, for example, the Q block signals as mentioned above, according to the number of azimuth grids, and for the blocks, $n_a$ azimuth matched filters are constructed according to equivalent velocity parameters corresponding to the blocks, expressed as:

$$H_{acomp-i}(R_{0k}; v_{0i}) = \exp\left\{-j4\pi \frac{R_{0k}D(v_{0i}, f_\eta)}{\lambda}\right\}, i = 1, 2, \ldots n_a \quad (10)$$

Filtering processing is performed on the whole azimuth signals for $n_a$ times by multiplying the $n_a$ azimuth matched filters $H_{acomp-i}(R_{0k}; v_{0i})$ by the second corrected signal $S_{Rd}(t, f_\eta)$, azimuth inverse transform is performed to transform the filtering processing results from the range-Doppler domain to the two-dimensional time domain, and transformation results are merged to obtain the intermediate imaging result that may be denoted as $Im(t_k, \eta_n)$, k representing a k-th range bin.

In 107, inverse Doppler center bias correction is performed on the intermediate imaging result by use of an inverse Doppler center phase correction function constructed based on the motion parameters corresponding to the center point of the imaging scene to obtain an azimuth final imaging result graph.

It is to be noted that a phase bias introduced in the processings of step 103 is re-corrected in the step 107.

Specifically, the inverse Doppler center phase correction function is constructed based on the Doppler center frequency corresponding to the center point of the imaging scene, and inverse Doppler center bias correction is performed on a phase bias of the intermediate imaging result based on the inverse Doppler center phase correction function to obtain the final imaging result graph.

Exemplarily, in the two-dimensional domain, the inverse Doppler center phase correction function $H'_a(\eta_n; f_{dc})$ is constructed by use of the Doppler center frequency $f_{dc}$ corresponding to the center point of the imaging scene, and the inverse Doppler center phase correction function $H'_a(\eta_n; f_{dc})$ is multiplied by the intermediate imaging result $Im(t, \eta_n)$ of each range bin, so as to implement inverse Doppler center bias correction on the phase bias of the intermediate imaging result, and thus to obtain the final imaging result graph.

With adoption of the technical solution, the motion parameters corresponding to the target point in the equivalent monostatic mode are calculated by use of the first motion trajectory, the second motion trajectory and the imaging parameters for focusing the radar echo signal, the target point at least including the center point of the imaging scene; azimuth Doppler center bias correction is performed on the echo signal by use of the motion parameters corresponding to the center point; uniform range cell migration correction and residual range cell migration correction are performed on the corrected signal, range blocking is performed, and the range space-variance phase errors are corrected block by block; then azimuth blocking is performed, and the corresponding number of filters are constructed for filtering processing; and inverse Doppler center bias correction is performed on the filtering processing result to obtain the final imaging result graph. In this way, range space-variance error correction and azimuth multi-matched-filter processing are performed on the radar echo signal so as to implement two-dimensional space-variance characteristic correction, and a phase error caused by imaging processing is thus reduced.

For the method for space-variance correction imaging of BiSAR, the disclosure provides a specific implementation solution, namely strengths of echo signals at 9 target points are obtained by the space-variance correction imaging method, and space-variance imaging correction is performed on them.

Specifically, a lattice target echo is generated by use of a parameter (a theoretical resolution/swath is 3 m/50 km) of an LT-1 spaceborne BiSAR system, and imaging processing is performed by use of the space-variance correction imaging method of the disclosure to verify the effectiveness of the technical solution.

Figure 5:
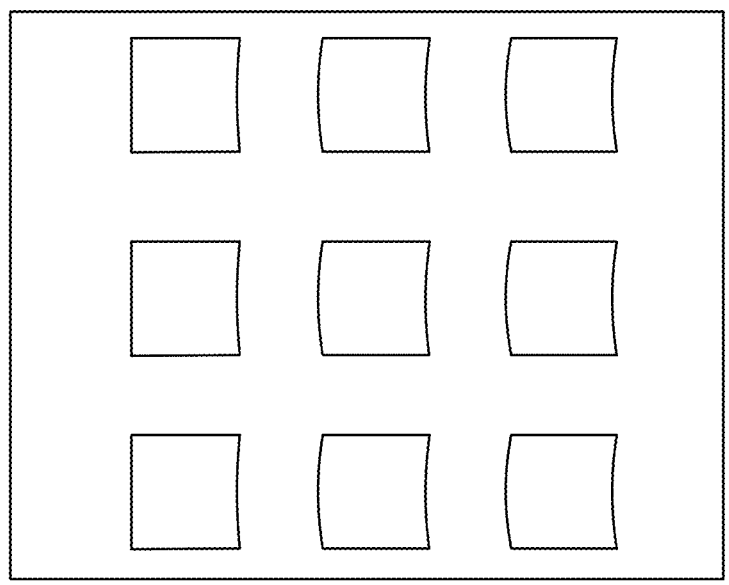
FIG. 5 is a schematic diagram of strengths of the echo signals at 9 target points according to some embodiments of the disclosure.

FIG. 5 is a schematic diagram of strengths of echo signals at 9 target points according to some embodiments of the disclosure. The target points are presented as nine separate signals because of an antenna radiation pattern of the radar. Herein, the antenna radiation pattern is truncated by an equivalent rectangle. The distance between each of the targets points is relatively far, and when one target point acquires a signal, another target point has yet not been irradiated by an electromagnetic wave. Therefore, the target points are separated in an azimuth direction, and distances between range directions are formed due to a limited pulse width.

Figure 6:
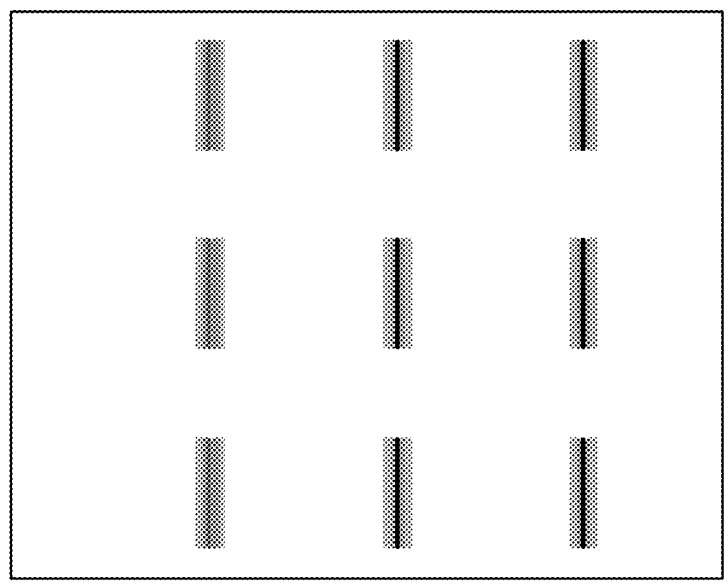
FIG. 6 is an imaging result graph obtained by range space-variance correction according to some embodiments of the disclosure.

FIG. 6 is an imaging result graph obtained by range space-variance correction according to some embodiments of the disclosure. That is, range space-variance correction is performed on echo signals to obtain line signals in FIG. 6.

Figure 7:
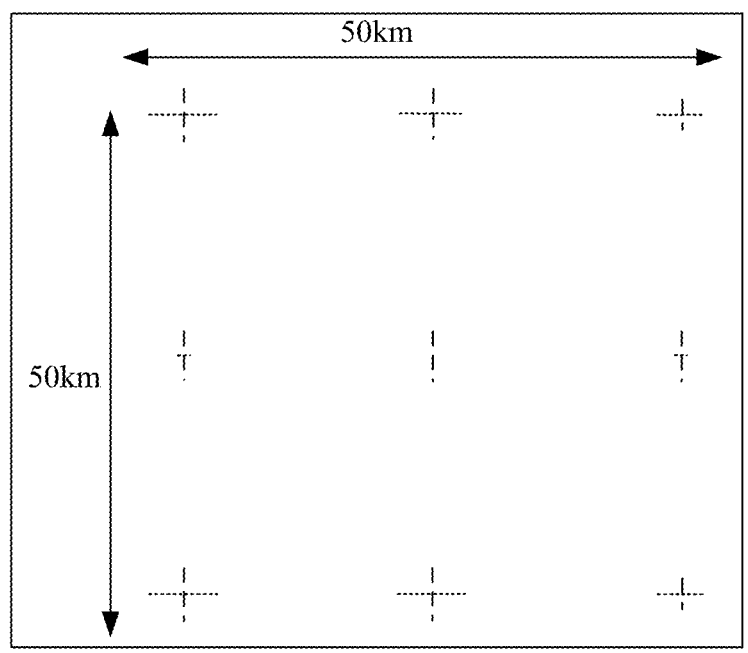
FIG. 7 is an imaging result graph obtained by azimuth space-variance correction according to some embodiments of the disclosure.

FIG. 7 is an imaging result graph obtained by azimuth space-variance correction according to some embodiments of the disclosure. That is, azimuth space-variance correction is performed on echo signals to form multiple point signals.

Figure 8:
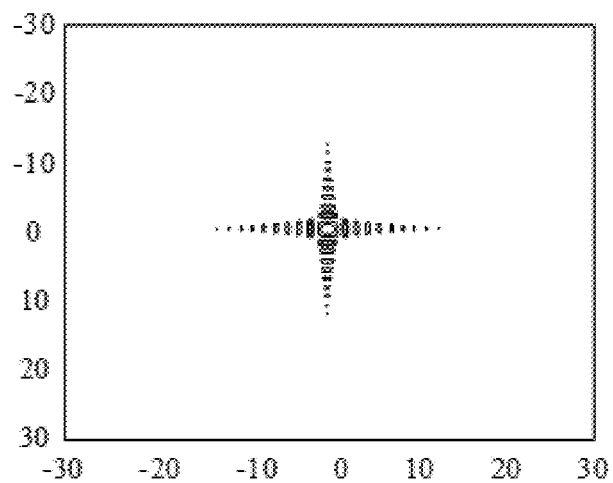
FIG. 8 is a simulation result graph of a target point at the upper right corner in FIG. 7 according to some embodiments of the disclosure.
Figure 9:
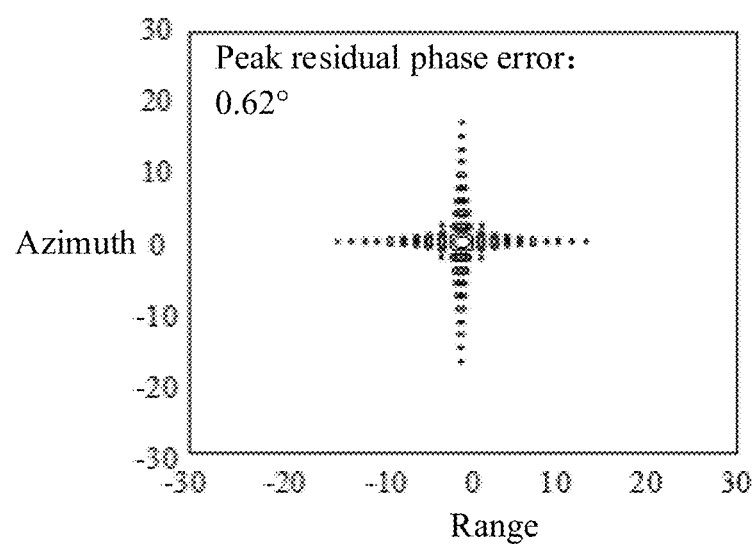
FIG. 9 is a schematic diagram of focusing quality of target points according to some embodiments of the disclosure.
Figure 10:
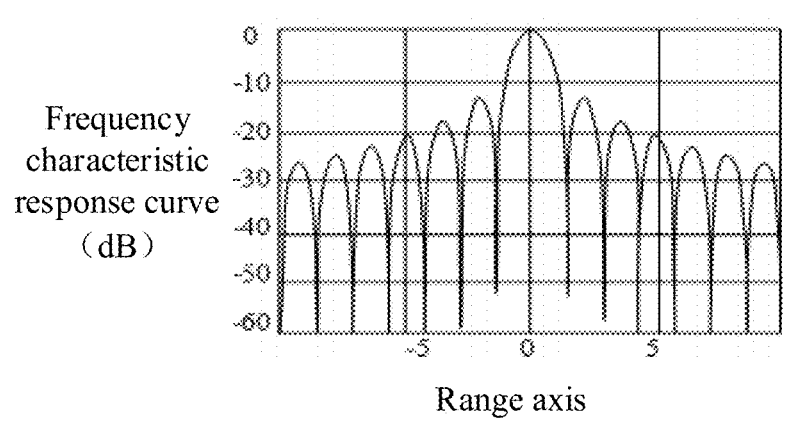
FIG. 10 is a schematic diagram of a frequency characteristic response curve of a target point in a range direction according to some embodiments of the disclosure.
Figure 11:
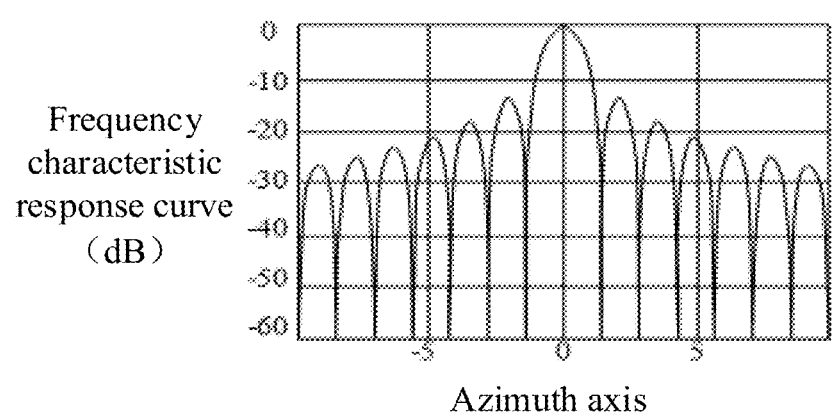
FIG. 11 is a schematic diagram of frequency characteristic response curve of a target point in an azimuth direction according to some embodiments of the disclosure.

FIG. 8 is a simulation result graph of a target point at the upper right corner in FIG. 7. FIG. 8 is a two-dimensional sectional view of the point at the upper right corner in FIG. 7. FIG. 9 shows focusing quality of the target point, with a peak residual phase error of 0.62°, which indicates that the imaging quality is very high. FIG. 10 and FIG. 11 show range and azimuth frequency characteristic response curves corresponding to a target point respectively, from which the effectiveness of the space-variance correction imaging method of the disclosure is verified.

Figure 12:
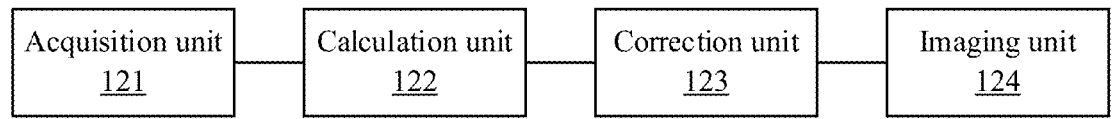
FIG. 12 is a structure diagram of an apparatus for space-variance correction imaging apparatus of BiSAR according to some embodiments of the disclosure.

The embodiments of the disclosure also provide an apparatus for space-variance correction imaging of BiSAR. FIG. 12 is a structure diagram of an apparatus for space-variance correction imaging of BiSAR according to some embodiments of the disclosure. As shown in FIG. 12, the apparatus includes an acquisition unit 121, a calculation unit 122, a correction unit 123 and an imaging unit 124.

The acquisition unit 121 is configured to acquire a first motion trajectory of a first satellite, a second motion trajectory of a second satellite, and a radar echo signal that is received by the second satellite.

The calculation unit 122 is configured to calculate motion parameters corresponding to a target point in an equivalent monostatic mode based on the first motion trajectory, the second motion trajectory and imaging parameters for focusing the radar echo signal, the target point at least including a center point of an imaging scene.

The correction unit 123 is configured to perform azimuth Doppler center bias correction on the radar echo signal based on the motion parameters corresponding to the center point of the imaging scene to obtain a Doppler center bias corrected signal.

The correction unit 123 is further configured to perform uniform range cell migration correction and residual range cell migration correction on the Doppler center bias corrected signal to obtain a first corrected signal.

The correction unit 123 is further configured to perform range blocking on the first corrected signal according to a range blocking strategy and correct range space-variance phase errors block by block to obtain a second corrected signal.

The correction unit 123 is further configured to perform azimuth blocking on the second corrected signal according to an azimuth blocking strategy and construct a corresponding number of azimuth matched filters to perform filtering processing to obtain an azimuth intermediate imaging result.

The imaging unit 124 is configured to perform inverse Doppler center bias correction on the intermediate imaging result by use of an inverse Doppler center phase correction function constructed based on the motion parameters corresponding to the center point of the imaging scene to obtain an azimuth final imaging result graph.

In some embodiments, the calculation unit 122 is specifically configured to obtain a position coordinate of the target point by use of the external DEM and the imaging parameter for focusing the radar echo signal, calculate a bistatic range history of the target point at each pulse transmission moment by use of the first motion trajectory, the second motion trajectory and the position coordinate of the target point and perform least variance fitting on the bistatic range history of the target point to obtain the motion parameters of the target point in the equivalent monostatic mode, where the motion parameters include a minimum range of the bistatic range history, an equivalent velocity obtained after fitting and a minimum time duration corresponding to the minimum range.

In some embodiments, the correction unit 123 is specifically configured to obtain a Doppler center frequency corresponding to the center point of the imaging scene based on the minimum range, equivalent velocity and time duration corresponding to the minimum range, construct an azimuth Doppler center frequency correction function based on the Doppler center frequency corresponding to the center point of the imaging scene and perform Doppler center bias correction of the radar echo signal in the azimuth direction based on the azimuth Doppler center frequency correction function and the radar echo signal to obtain the Doppler center bias corrected signal.

In some embodiments, the correction unit 123 is further specifically configured to transform the Doppler center bias corrected signal from a two-dimensional time domain to a two-dimensional frequency domain through range Fourier transform and azimuth Fourier transform to obtain a two-dimensional frequency-domain signal; obtain a uniform range corrected signal based on the two-dimensional frequency-domain signal and a uniform range correction function that is constructed based on the motion parameters corresponding to the center point of the imaging scene; transform the uniform range corrected signal from the two-dimensional frequency domain to a range-Doppler domain to obtain a range-Doppler domain signal; determine equivalent velocities for N range points on a range axis of the range-Doppler domain according to closest ranges and equivalent velocities for M target points in an imaging scene, where the M target points including the center point of the imaging scene and at least one reference point of an imaging scene on a preset trajectory and N being a positive integer; obtain residual range cell migration correction according to the minimum range and equivalent velocity for the center point of the imaging scene and the equivalent velocities for the N range points and obtain the first corrected signal based on the residual range cell migration correction and the range-Doppler domain signal.

In some embodiments, the correction unit 123 is further specifically configured to perform range blocking on the first corrected signal according to the range blocking strategy to obtain P block signals, and transform the obtained P block signals from the range-Doppler domain to the two-dimensional frequency domain to obtain P two-dimensional frequency-domain block signals, P being an integer greater than 1; calculate P space-variance phase error terms according to the motion parameters of the target point in the P two-dimensional frequency-domain block signals; perform phase correction on the P two-dimensional frequency-domain block signals by use of the P range space-variance phase error terms to obtain P phase corrected block signals; transform the P phase corrected block signals from the two-dimensional frequency domain to the range-Doppler domain and merge transformation results to obtain the second corrected signal subjected to the range space-variance correction.

In some embodiments, the correction unit 123 is further specifically configured to: perform azimuth blocking on the second corrected signal according to the azimuth blocking strategy to obtain Q block signals, construct Q corresponding azimuth matched filters, Q being an integer greater than 1; perform filtering processing on the Q block signals by use of the Q azimuth matched filters to obtain Q matched filtering processing results respectively; and transform the Q matched filtering processing results from the range-Doppler domain to the two-dimensional time domain and merge transformation results to obtain the intermediate imaging result.

In some embodiments, the imaging unit 124 is specifically configured to: construct the inverse Doppler center phase correction function based on the Doppler center frequency corresponding to the center point of the imaging scene and perform inverse Doppler center bias correction of a phase bias in the intermediate imaging result based on the inverse Doppler center phase correction function to obtain the final imaging result graph.

With adoption of the technical solution, the motion parameter corresponding to the target point in the equivalent monostatic mode is calculated by use of the first motion trajectory, the second motion trajectory and the imaging parameter for focusing the radar echo signal, the target point at least including the center point of the imaging scene; azimuth Doppler center bias correction is performed on the echo signal by use of the motion parameter corresponding to the center point; uniform range cell migration correction and residual range cell migration correction are performed on the corrected signal, range blocking is performed, and the range space-variance phase errors are corrected block by block; then azimuth blocking is performed, and the corresponding number of filters are constructed for filtering processing; and inverse Doppler center bias correction is performed on the filtering processing result to obtain the final imaging result graph. In this way, range space-variance error correction and azimuth multi-matched-filter processing are performed on the radar echo signal so as to implement two-dimensional space-variance characteristic correction, and thus a phase error caused by imaging processing is reduced.

Figure 13:
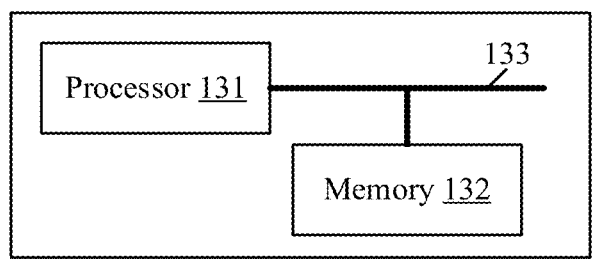
FIG. 13 is a structure diagram of a device for space-variance correction imaging of BiSAR according to some embodiments of the disclosure.

The embodiments of the disclosure also provide a device for space-variance correction imaging of BiSAR. As shown in FIG. 13, the device includes a processor 131 and a memory 132 configured to store computer programs capable of running in the processor. The processor 131 is configured to run the computer programs in the memory 132 to implement the following steps.

A first motion trajectory of a first satellite, a second motion trajectory of a second satellite, and a radar echo signal acquired by the second satellite are acquired.

At least one motion parameter corresponding to a target point in an equivalent monostatic mode is calculated based on the first motion trajectory, the second motion trajectory and an imaging parameter for focusing the radar echo signal, the target point at least including a center point of an imaging scene.

Azimuth Doppler center bias correction is performed on the radar echo signal based on the at least one motion parameter corresponding to the center point of the imaging scene to obtain a Doppler center bias corrected signal.

Uniform range cell migration correction and residual range cell migration correction are performed on the Doppler center bias corrected signal to obtain a first corrected signal.

Range blocking is performed on the first corrected signal according to a range blocking strategy, and range space-variance phase errors are corrected block by block to obtain a second corrected signal.

Azimuth blocking is performed on the second corrected signal according to an azimuth blocking strategy to obtain a number of azimuth second corrected signal blocks, and a corresponding number of azimuth matched filters are constructed to perform filtering processing on the obtained number of azimuth second corrected signal blocks to obtain an azimuth intermediate imaging result.

Inverse Doppler center bias correction is performed on the intermediate imaging result by use of an inverse Doppler center phase correction function constructed based on the at least one motion parameters corresponding to the center point of the imaging scene to obtain an azimuth final imaging result graph.

In some embodiments, the processor 131 is configured to execute the computer programs in the memory 132 to further implement the following steps. A position coordinate of the target point is obtained by use of the external DEM and the imaging parameter for focusing the radar echo signal; a bistatic range history of the target point at each pulse transmission moment is calculated by use of the first motion trajectory, the second motion trajectory and the position coordinate of the target point; and least variance fitting is performed on the bistatic range history of the target point to obtain the motion parameters of the target point in the equivalent monostatic mode, the motion parameters including a minimum range of the bistatic range history, an equivalent velocity obtained after fitting and a minimum time duration corresponding to the minimum range.

In some embodiments, the processor 131 is configured to execute the computer programs in the memory 132 to further implement the following steps. A Doppler center frequency corresponding to the center point of the imaging scene is obtained based on the minimum range, equivalent velocity and time duration corresponding to the minimum range; an azimuth Doppler center frequency correction function is constructed based on the Doppler center frequency corresponding to the center point of the imaging scene; and azimuth Doppler center bias correction is performed on the radar echo signal based on the azimuth Doppler center frequency correction function and the radar echo signal to obtain the Doppler center bias corrected signal.

In some embodiments, the processor 131 is configured to execute the computer programs in the memory 132 to further implement the following steps. The Doppler center bias corrected signal is transformed from a two-dimensional time domain to a two-dimensional frequency domain through range Fourier transform and azimuth Fourier transform to obtain a two-dimensional frequency-domain signal; a uniform range corrected signal is obtained based on a uniform range correction function constructed based on the motion parameter corresponding to the center point of the imaging scene and the two-dimensional frequency-domain signal; the uniform range corrected signal is transformed from the two-dimensional frequency domain to a range-Doppler domain to obtain a range-Doppler domain signal; equivalent velocities for N range points on a range axis of the range-Doppler domain are determined according to minimum ranges and equivalent velocities for M target points in an imaging scene, where the M target points include the center point of the imaging scene and at least one reference point of the imaging scene that are located on a preset trajectory, and N is a positive integer; residual range cell migration correction is obtained according to the minimum range and equivalent velocity for the center point of the imaging scene and the equivalent velocities for the N range points; and the first corrected signal is obtained based on the residual range cell migration correction and the range-Doppler domain signal.

In some embodiments, the processor 131 is configured to execute the computer programs in the memory 132 to further implement the following step. Range blocking is performed on the first corrected signal according to the range blocking strategy, and P obtained block signals are transformed from the range-Doppler domain to the two-dimensional frequency domain to obtain P two-dimensional frequency-domain block signals, P being an integer greater than 1; P space-variance phase error terms are calculated according to the motion parameters of the target point in the P two-dimensional frequency-domain block signals; phase correction is performed on the P two-dimensional frequency-domain block signals by use of the P range space-variance phase error terms to obtain P phase corrected block signals; and the P phase corrected block signals are transformed from the two-dimensional frequency domain to the range-Doppler domain, and transformation results are merged to obtain the second corrected signal obtained by range space-variance correction.

In some embodiments, the processor 131 is configured to execute the computer programs in the memory 132 to further implement the following steps. Azimuth blocking is performed on the second corrected signal according to the azimuth blocking strategy to obtain Q block signals and Q corresponding azimuth matched filters are constructed, Q being an integer greater than 1; filtering processing is performed on the obtained Q block signals by use of the Q azimuth matched filters to obtain Q matched filtering processing results respectively; and the Q matched filtering processing results are transformed from the range-Doppler domain to the two-dimensional time domain, and transformation results are merged to obtain the intermediate imaging result.

In some embodiments, the processor 131 is configured to execute the computer programs in the memory 132 to further implement the following steps. The inverse Doppler center phase correction function is constructed based on the Doppler center frequency corresponding to the center point of the imaging scene; and inverse Doppler center bias correction is performed on a phase bias of the intermediate imaging result based on the inverse Doppler center phase correction function to obtain the final imaging result graph.

Of course, during practical application, as shown in FIG. 13, various components in the device for space-variance correction imaging of BiSAR are coupled through a bus system 133. It can be understood that the bus system 133 is configured to implement connection communication between these components. The bus system 133 includes a data bus and further includes a power bus, a control bus and a state signal bus. However, for clear description, various buses in FIG. 13 are marked as the bus system 133.

An embodiment of the disclosure also provides a computer-readable storage medium, which is configured to store computer programs.

In some embodiments, the computer-readable storage medium may be applied to any method in the embodiments of the disclosure, and the computer programs enable a computer to execute corresponding operations implemented by the processor in each method of the embodiments of the disclosure. For simplicity, elaborations are omitted herein.

In some embodiments provided by the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, various functional units in each embodiment of the disclosure may be integrated into a processing module, each unit may also serve as an independent unit and two or more than two units may also be integrated into a unit. The integrated unit may be implemented in a hardware form and may also be implemented in form of hardware and software functional unit.

The methods disclosed in some method embodiments of the disclosure may be freely combined without conflicts to obtain new method embodiments.

The characteristics disclosed in some product embodiments provided in the disclosure may be freely combined without conflicts to obtain new product embodiments.

The characteristics disclosed in some method or device embodiments of the disclosure may be freely combined without conflicts to obtain new method embodiments or device embodiments.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for space-variance correction imaging of Bistatic Synthetic Aperture Radar (BiSAR), the method comprising:
    acquiring a first motion trajectory of a first satellite, a second motion trajectory of a second satellite and a radar echo signal that is received by the second satellite;
    calculating motion parameters corresponding to a target point in an equivalent monostatic mode based on the first motion trajectory, the second motion trajectory and imaging parameters for focusing the radar echo signal, wherein the target point at least comprises a center point of an imaging scene;
    performing azimuth Doppler center bias correction on the radar echo signal based on the motion parameters corresponding to the center point of the imaging scene to obtain a Doppler center bias corrected signal;
    performing uniform range cell migration correction and residual range cell migration correction on the Doppler center bias corrected signal to obtain a first corrected signal;
    performing range blocking on the first corrected signal according to a range blocking strategy, and correcting range space-variance phase errors block by block to obtain a second corrected signal;
    performing azimuth blocking on the second corrected signal according to an azimuth blocking strategy, and constructing a corresponding number of azimuth matched filters to perform filtering processing to obtain an intermediate azimuth imaging result; and
    performing inverse Doppler center bias correction on the intermediate imaging result by use of an inverse Doppler center phase correction function constructed based on the motion parameter corresponding to the center point of the imaging scene, to obtain a final azimuth imaging result.

2. The method of claim 1, wherein calculating the motion parameters corresponding to the target point in the equivalent monostatic mode based on the first motion trajectory, the second motion trajectory and the imaging parameter for focusing the radar echo signal comprises:
    obtaining a position coordinate of the target point by use of an external Digital Elevation Model (DEM) and the imaging parameter for focusing the radar echo signal;
    calculating a bistatic range history of the target point at each pulse transmission moment by use of the first motion trajectory, the second motion trajectory and the position coordinate of the target point; and
    performing least variance fitting on the bistatic range history of the target point to obtain the motion parameter of the target point in the equivalent monostatic mode, wherein the motion parameters comprise: a minimum range of the bistatic range history, an equivalent velocity obtained after fitting and a time duration corresponding to the minimum range.

3. The method of claim 2, wherein performing azimuth Doppler center bias correction on the radar echo signal based on the motion parameter corresponding to the center point of the imaging scene to obtain the Doppler center bias corrected signal comprises:
    obtaining a Doppler center frequency corresponding to the center point of the imaging scene based on a minimum range, an equivalent velocity and a time duration corresponding to the minimum range for the center point of the imaging scene;
    constructing an azimuth Doppler center frequency correction function based on the Doppler center frequency corresponding to the center point of the imaging scene; and
    performing azimuth Doppler center bias correction on the radar echo signal based on the azimuth Doppler center frequency correction function and the radar echo signal to obtain the Doppler center bias corrected signal.

4. The method of claim 3, wherein performing inverse Doppler center bias correction on the intermediate imaging result by use of the inverse Doppler center phase correction function constructed based on the motion parameter corresponding to the center point of the imaging scene, to obtain the final azimuth imaging result comprises:
constructing the inverse Doppler center phase correction function based on the Doppler center frequency corresponding to the center point of the imaging scene; and
performing inverse Doppler center bias correction on a phase bias of the intermediate imaging result based on the inverse Doppler center phase correction function to obtain the final imaging result.

5. The method of claim 2, wherein performing uniform range cell migration correction and residual range cell migration correction on the Doppler center bias corrected signal to obtain the first corrected signal comprises:
transforming the Doppler center bias corrected signal from a two-dimensional time domain to a two-dimensional frequency domain through range Fourier transform and azimuth Fourier transform to obtain a two-dimensional frequency-domain signal;
obtaining a uniform range corrected signal based on a uniform range correction function and the two-dimensional frequency-domain signal, the uniform range correction function being constructed based on the motion parameters corresponding to the center point of the imaging scene;
transforming the uniform range corrected signal from the two-dimensional frequency domain to a range-Doppler domain to obtain a range-Doppler-domain signal;
determining equivalent velocities for N range points in a range direction of the range-Doppler domain according to minimum ranges and equivalent velocities for M target points in the imaging scene, wherein the M target points comprises the center point of the imaging scene and at least one reference point of the imaging scene which are located on a preset trajectory, and N is a positive integer;
obtaining the residual range cell migration correction according to a minimum range and an equivalent velocity for the center point of the imaging scene and the equivalent velocities for the N range points; and
obtaining the first corrected signal based on the residual range cell migration correction and the range-Doppler-domain signal.

6. The method of claim 2, wherein performing range blocking on the first corrected signal according to the range blocking strategy and correcting the range space-variance phase errors block by block to obtain the second corrected signal comprises:
performing range blocking on the first corrected signal according to the range blocking strategy to obtain P block signals, and transforming the obtained P block signals from the range-Doppler domain to the two-dimensional frequency domain to obtain P two-dimensional frequency-domain block signals, P being an integer greater than 1;
calculating P space-variance phase error terms according to motion parameters of target points in the P two-dimensional frequency-domain block signals;
performing phase correction on the P two-dimensional frequency-domain block signals by use of the P range space-variance phase error terms to obtain P phase corrected block signals; and
transforming the P phase corrected block signals from the two-dimensional frequency domain to the range-Doppler domain, and merging transformation results to obtain the second corrected signal subjected to the range space-variance correction.

7. The method of claim 2, wherein performing azimuth blocking on the second corrected signal according to the azimuth blocking strategy and constructing the corresponding number of azimuth matched filters to perform filtering processing to obtain the intermediate azimuth imaging result comprises:
performing azimuth blocking on the second corrected signal according to the azimuth blocking strategy to obtain Q block signals, and constructing Q corresponding azimuth matched filters, Q being an integer greater than 1;
performing filtering processing on the Q block signals by use of the Q azimuth matched filters to obtain Q matched filtering processing results; and
transforming the Q matched filtering processing results from the range-Doppler domain to the two-dimensional time domain, and merging transformation results to obtain the intermediate imaging result.

8. A device for space-variance correction imaging of Bistatic Synthetic Aperture Radar (BiSAR), comprising: a processor and a memory configured to store computer programs capable of running in the processor,
wherein the processor, upon execution of the computer programs, is configured to:
acquire a first motion trajectory of a first satellite, a second motion trajectory of a second satellite and a radar echo signal that is received by the second satellite;
calculate motion parameters corresponding to a target point in an equivalent monostatic mode based on the first motion trajectory, the second motion trajectory and imaging parameters for focusing the radar echo signal, wherein the target point at least comprises a center point of an imaging scene;
perform azimuth Doppler center bias correction on the radar echo signal based on motion parameters corresponding to the center point of the imaging scene to obtain a Doppler center bias corrected signal;
perform uniform range cell migration correction and residual range cell migration correction on the Doppler center bias corrected signal to obtain a first corrected signal;
perform range blocking on the first corrected signal according to a range blocking strategy, and correct range space-variance phase errors block by block to obtain a second corrected signal;
perform azimuth blocking on the second corrected signal according to an azimuth blocking strategy, and construct a corresponding number of azimuth matched filters to perform filtering processing to obtain an intermediate azimuth imaging result; and
perform inverse Doppler center bias correction on the intermediate imaging result by use of an inverse Doppler center phase correction function constructed based on the motion parameter corresponding to the center point of the imaging scene, to obtain a final azimuth imaging result.

9. The device of claim 8, wherein the processor is further configured to:
obtain a position coordinate of the target point by use of an external Digital Elevation Model (DEM) and the imaging parameter for focusing the radar echo signal;
calculate a bistatic range history of the target point at each pulse transmission moment by use of the first motion trajectory, the second motion trajectory and the position coordinate of the target point; and perform least variance fitting on the bistatic range history of the target point to obtain the motion parameter of the target point in the equivalent monostatic mode, wherein the motion parameters comprise: a minimum range of the bistatic range history, an equivalent velocity obtained after fitting and a time duration corresponding to the minimum range.

10. The device of claim 9, wherein the processor is further configured to:

obtain a Doppler center frequency corresponding to the center point of the imaging scene based on a minimum range, an equivalent velocity and a time duration corresponding to the minimum range for the center point of the imaging scene;

construct an azimuth Doppler center frequency correction function based on the Doppler center frequency corresponding to the center point of the imaging scene; and perform azimuth Doppler center bias correction on the radar echo signal based on the azimuth Doppler center frequency correction function and the radar echo signal to obtain the Doppler center bias corrected signal.

11. The device of claim 10, wherein the processor is further configured to:

construct the inverse Doppler center phase correction function based on the Doppler center frequency corresponding to the center point of the imaging scene; and perform inverse Doppler center bias correction on a phase bias of the intermediate imaging result based on the inverse Doppler center phase correction function to obtain the final imaging result.

12. The device of claim 9, wherein the processor is further configured to:

transform the Doppler center bias corrected signal from a two-dimensional time domain to a two-dimensional frequency domain through range Fourier transform and azimuth Fourier transform to obtain a two-dimensional frequency-domain signal;

obtain a uniform range corrected signal based on a uniform range correction function and the two-dimensional frequency-domain signal, the uniform range correction function being constructed based on the motion parameters corresponding to the center point of the imaging scene;

transform the uniform range corrected signal from the two-dimensional frequency domain to a range-Doppler domain to obtain a range-Doppler domain signal;

determine equivalent velocities for N range points in a range direction of the range-Doppler domain according to minimum ranges and equivalent velocities for M target points in the imaging scene, wherein the M target points comprises the center point of the imaging scene and at least one reference point of the imaging scene which are located on a preset trajectory, and N is a positive integer;

obtain the residual range cell migration correction according to a minimum range and an equivalent velocity for the center point of the imaging scene and the equivalent velocities for the N range points; and obtain the first corrected signal based on the residual range cell migration correction and the range-Doppler-domain signal.

13. The device of claim 9, wherein the processor is further configured to:

perform range blocking on the first corrected signal according to the range blocking strategy to obtain P block signals, and transform the obtained P block signals from the range-Doppler domain to the two-dimensional frequency domain to obtain P two-dimensional frequency-domain block signals, P being an integer greater than 1;

calculate P space-variance phase error terms according to motion parameters of target points in the P two-dimensional frequency-domain block signals;

perform phase correction on the P two-dimensional frequency-domain block signals by use of the P range space-variance phase error terms to obtain P phase corrected block signals; and transform the P phase corrected block signals from the two-dimensional frequency domain to the range-Doppler domain and merge transformation results to obtain the second corrected signal subjected to the range space-variance correction.

14. The device of claim 9, wherein the processor is further configured to:

perform azimuth blocking on the second corrected signal according to the azimuth blocking strategy to obtain Q block signals and construct Q corresponding azimuth matched filters, Q being an integer greater than 1;

perform filtering processing on the Q block signals by use of the Q azimuth matched filters to obtain Q matched filtering processing results; and transform the Q matched filtering processing results from the range-Doppler domain to the two-dimensional time domain and merge transformation results to obtain the intermediate imaging result.

* * * * *